United States Patent Office

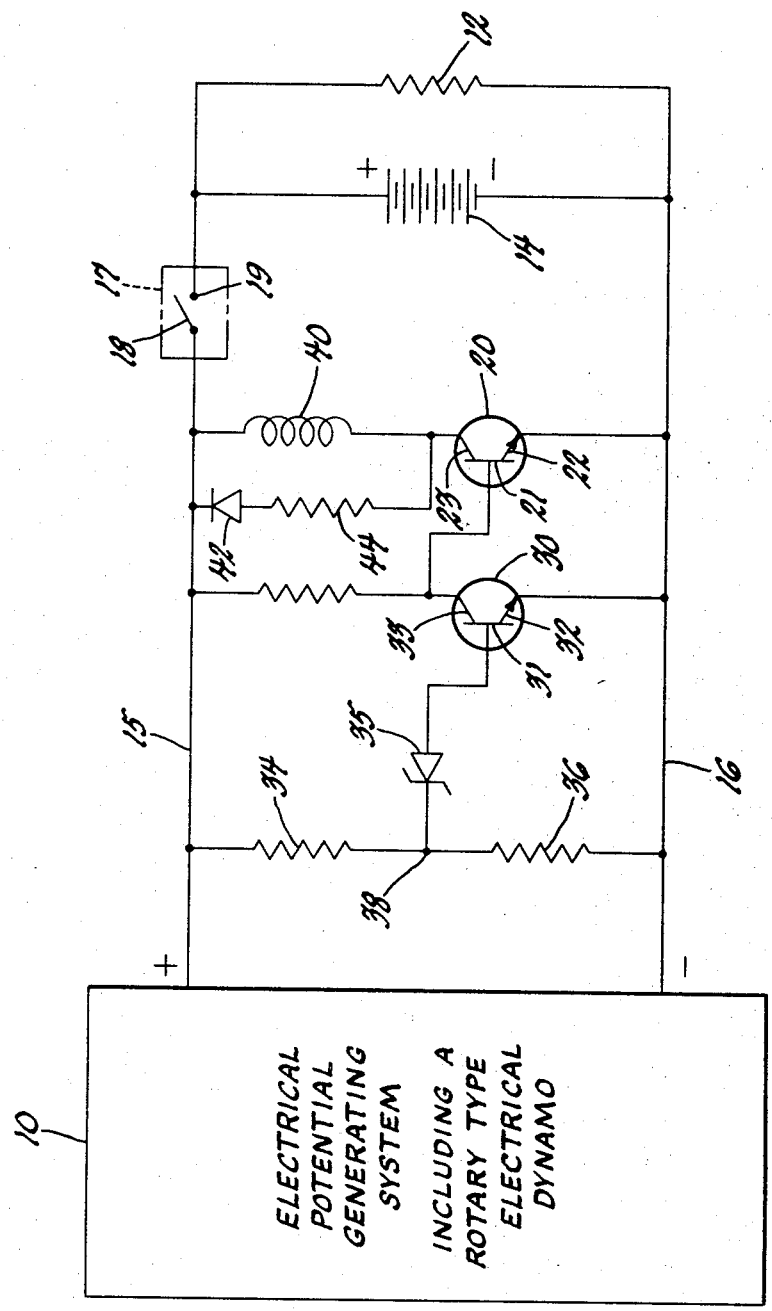
INVENTORS
Glen E. Harland, Jr.
Johan Lund
BY
Richard G. Stahr
THEIR ATTORNEY

3,406,318
Patented Oct. 15, 1968

3,406,318
POTENTIAL REGULATOR WITH AN ELECTRICAL POLARITY REVERSAL PROTECTION FEATURE
Glen E. Harland, Jr., and Johan Lund, Kokomo, Ind., assignors to General Motors Corporation, Detroit, Mich., a corporation of Delaware
Filed Feb. 1, 1966, Ser. No. 524,094
1 Claim. (Cl. 317—43)

ABSTRACT OF THE DISCLOSURE

A direct current electrical generating system including a rotary type electrical dynamo having a field coil and a solid state potential regulator circuit including a field switching transistor for regulating the system output potential wherein a resistor, which is selected to be of an ohmic value of sufficient magnitude to produce a potential drop thereacross which will reduce the potential across the field discharge diode to a value equal to or less than the rated forward bias potential thereof in the event a battery is connected in a reverse polarity relationship across the system output terminals, is connected in series with the field discharge diode.

---

This invention relates to solid state potential regulators and, more specifically, to solid state potential regulators having an electrical polarity reversal protection feature.

In electrical generating systems which include rotary type electrical dynamos, the system potential may be maintained at substantially a predetermined magnitude by regulating the current flow through the dynamo field coil in response to changes of magnitude of system potential. With solid state potential regulator circuits, the current carrying electrodes of a field switching transistor device are connected in series with the field coil of the dynamo for establishing and interrupting the field coil energizing circuit, in response to changes of magnitude of system potential, below and above the predetermined magnitude, respectively. As the field coil is highly inductive, a high potential of a reverse polarity relationship is induced thereacross with each interruption of the energizing circuit. To prevent the destruction of the transistor switching device by this induced potential, a field discharge diode is connected in shunt with the field coil and forward poled in respect to the induced potential.

In the event of an electrical polarity reversal upon the system, such as connecting a battery thereacross in a reverse polarity relationship or by paralleling one or more other generating systems therewith in a reverse polarity relationship, the field discharge diode is forward poled in respect to the incorrectly poled potential source. With a field switching transistor device having a rated emitter-base reverse breakdown potential of a magnitude less than system potential, the incorrectly poled potential appears across the field discharge diode in a forward direction. As the electrical resistance in this circuit is very low, the current flow through the field discharge diode resulting from the incorrectly poled potential substantially instantaneously destroys the device. With the field discharge diode destroyed, the potential induced in the dynamo field coil upon the next interruption of the field coil energizing circuit appears across the current carrying electrodes of the transistor switching device and, consequently, may destroy this device.

Prior art potential regulating systems usually included a diode in series with the current carrying electrodes of the field switching transistor device and poled to provide protection against electrical polarity reversal. The inclusion of this extra diode produced an additional potential drop in the field energizing circuit which resulted in a reduction of the potential available to the field and, consequently, a reduced dynamo output, introduced an additional power consuming element in the circuit and required an additional expensive semiconductor device.

As the use of solid state type potential regulating systems are becoming increasingly popular, the requirement of a reliable and economical potential polarity reversal protection feature without the disadvantages of an additional diode or other semiconductor device, is apparent.

It is, therefore, an object of this invention to provide an improved solid state potential regulating circuit.

It is anther object of this invention to provide an improved solid state potential regulating circuit having an electrical polarity reversal protection feature.

In accordance with this invention, a solid state potential regulating circuit having an electrical polarity reversal protection feature is provided wherein the series combination of an impedance element and a field discharge diode is connected in parallel with the field coil of an electrical dynamo.

For a better understanding of the present invention, together with additional objects, advantages and features thereof, reference is made to the following description and accompanying single figure drawings.

Referring to the figure, the novel potential regulating circuit having electrical polarity reversal protection of this invention is set forth in schematic form in combination with an electrical generating system and a solid state potential regulating circuit. As this circuitry may be employed with any electrical potential generating system including a rotary tupe electrical dynamo and since the generating system per se forms no part of this invention, the generating system has been illustrated in the drawing in schematic form and referenced by the numeral 10.

The electrical potential generating system 10 may supply electrical power to an external electrical load, illustrated in the figure as a resistor 12 but which may consist of any other electrically energized element or combination of elements, and to charge a conventional storage type battery 14. The electrical load 12 and battery 14 may be connected across the system positive and negative polarity lines 15 and 16, respectively, through a single pole, single throw switch 17 having a movable contact 18 and a stationary contact 19.

The solid state potential regulating circuit schematically set forth in the figure includes a type NPN field switching transistor 20 having the usual base 21, emitter 22 and collector 23 electrodes, a type NPN control transistor 30 having the usual base 31, emitter 32 and collector 33 electrodes and a potential sensing arrangement including a voltage divider network comprising the series combination of resistors 34 and 36 connected across the system positive and negative polarity lines 15 and 16 and a Zener diode 35 connected between junction 38 and the base electrode 31 of transistor 30.

The current carrying electrodes, emitter electrode 22 and collector electrode 23, of field switching transistor 20 are connected in series with the electrical dynamo field coil 40 across the system positive and negative polarity lines 15 and 16. To facilitate the description of this invention, field coil 40 has been schematically shown externally of the dynamo included in the generating system 10.

The polarity of the potential appearing across lines 15 and 16 may become reversed with any one of several circumstances. For example, battery 14 may be inadvertently connected across lines 15 and 16 in a reverse polarity relationship or another battery connected in parallel with battery 14 may be inadvertently connected in a reverse polarity relationship across lines 15 and 16. Under these conditions, with electrical potential generating system 10 at rest, the potential across lines 15 and 16 would be reversed. The inadvertent connection of batteries in a reverse polarity relationship is common in automotive applications.

Other applications may require the paralleling of one or more electrical potential generating systems similar to generating system 10. Should the output terminals of any one of these generating systems be inadvertently connected to lines 15 and 16 in a reverse polarity relationship, the potential upon lines 15 and 16 would be reversed.

With a field switching transistor 20 having a reverse emitter-base breakdown potential rating of a magnitude less than the reverse polarity potential, upon the occurrence of a reversal of the polarity of the potential upon lines 15 and 16, field switching transistor 20 would conduct in a reverse direction and a substantial portion of the reverse polarity potential would appear in a forward direction across field discharge diode 42, strongly forward biasing this device. As the magnitude of current flow through a forward biased diode increases drastically with small changes of forward bias potential, the current flow resulting from the reverse polarity potential across lines 15 and 16 would substantially instantaneously destroy field discharge diode 42.

With field discharge diode 42 destroyed, the dissipating circuit, field winding 40 and parallel connected field discharge diode 42, for the high potential induced in field coil 40 would be open. Under these conditions, with the next interruption of the energizing circuit for field coil 40, this high induced potential would appear in a reverse polarity relationship across the emitter-collector electrodes of field switching transistor 20 and may destroy this device.

To provide a reverse electrical polarity protection feature, an impedance element, which may be a resistor 44, is connected in series with field discharge diode 42 and this series combination is connected in parallel with field coil 40. With this arrangement, most of the reverse polarity potential appearing across lines 15 and 16 is dropped across the impedance element, resistor 44, consequently, the forward potential drop across field discharge diode 42 is limited to a small and safe magnitude. In a practical application, the impedance element was a resistor of a value of 20 ohms in a generating system of 14 volts.

The parallel combination of series connected field discharge diode 42 and resistor 44 and field coil 40 appear as an equivalent series resistor in the emitter-collector circuit of field switching transistor 20 which limits the current flow through this device to a safe value.

From this description, it is apparent that the inclusion of an impedance element, resistor 44, in series with field discharge diode 42 provides a reverse polarity protection feature which prevents the destruction of both the field discharge diode 42 and the field switching transistor 20 with reverse electrical polarities across the system.

While specific electrical polarities and semiconductor devices have been set forth in this specification, it is to be specifically understood that alternate semiconductor devices and compatible electrical polarities may be employed without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claim.

What is claimed is as follows:

1. A direct current electrical generating system including at least a rotary type electrical dynamo having a field coil, a storage battery, positive and negative polarity direct current output potential lines for supplying direct current potential to said storage battery and an external load, a solid state potential regulator circuit including a field switching transistor for regulating the system output potential, means for connecting said dynamo field coil and the collector-emitter electrodes of said field switching transistor in series across said direct current output potential lines, a field discharge diode, a resistor, means for connecting said field discharge diode in series with said resistor which is selected to be of an ohmic value of sufficient magnitude to produce a potential drop thereacross which will reduce the potential across said field discharge diode to a value equal to or less than the rated forward bias potential thereof in the event said battery is connected across said output potential lines in a reverse polarity relationship, and means for connecting the series combination of said resistor and said field discharge diode in parallel with said field coil of said dynamo.

References Cited
UNITED STATES PATENTS 3,168,693  2/1965  Eckenfelder _____ 322—28
3,263,155  7/1966  Dietl _____ 322—28

LEE T. HIX, *Primary Examiner.*

J. D. TRAMMELL, *Assistant Examiner.*